United States Patent
Shpilyuck et al.

(10) Patent No.: US 9,154,398 B1
(45) Date of Patent: Oct. 6, 2015

(54) METHOD AND SYSTEM FOR IDENTIFYING ROOT CAUSES OF APPLICATION UNDERACHIEVEMENT IN A VIRTUALLY PROVISIONED ENVIRONMENT

(71) Applicant: EMC Corporation, Hopkinton, MA (US)

(72) Inventors: Boris Shpilyuck, Dublin, CA (US); Dmitry Limonov, Dublin, CA (US); Alex Rankov, Danville, CA (US); Dmitry Volchegursky, Pleasanton, CA (US)

(73) Assignee: EMC CORPORATION, Hopkinton, MA (US)

( * ) Notice: Subject to any disclaimer, the term of this patent is extended or adjusted under 35 U.S.C. 154(b) by 133 days.

(21) Appl. No.: 13/782,349

(22) Filed: Mar. 1, 2013

(51) Int. Cl.
  *G06F 15/16* (2006.01)
  *H04L 12/26* (2006.01)

(52) U.S. Cl.
  CPC ..................................... *H04L 43/16* (2013.01)

(58) Field of Classification Search
  CPC ............ G06F 11/3419; G06F 11/3466; G06F 11/3476; G06F 11/3495; G06F 2201/805; G06F 2201/81; G06F 2201/86; G06F 2201/865; G06F 2201/87; G06F 2201/885; G06F 8/316; G06F 8/61; G06F 9/45546; H04L 65/80; H04L 43/08; H04L 43/16; H04L 12/2602; H04L 41/5025; H04L 43/0817; H04L 43/0876
  USPC .................................. 709/217, 220, 222–228
  See application file for complete search history.

(56) References Cited

U.S. PATENT DOCUMENTS

| | | | |
|---|---|---|---|
| 5,867,483 A * | 2/1999 | Ennis et al. .................... | 370/252 |
| 8,005,644 B1 * | 8/2011 | Evans et al. .................... | 702/183 |
| 8,031,634 B1 * | 10/2011 | Artzi et al. ..................... | 370/254 |
| 8,032,867 B2 * | 10/2011 | Bansal ........................... | 717/128 |
| 2005/0223020 A1 * | 10/2005 | Cutlip et al. ................... | 707/102 |
| 2006/0069780 A1 * | 3/2006 | Batni et al. ..................... | 709/226 |
| 2006/0167891 A1 * | 7/2006 | Blaisdell et al. ............... | 707/10 |
| 2006/0200546 A9 * | 9/2006 | Bailey et al. ................... | 709/224 |
| 2008/0109684 A1 * | 5/2008 | Addleman et al. .............. | 714/47 |
| 2008/0306711 A1 * | 12/2008 | Bansal ........................... | 702/182 |
| 2009/0031321 A1 * | 1/2009 | Ishizawa et al. ............... | 718/105 |
| 2009/0122706 A1 * | 5/2009 | Alfano et al. .................. | 370/237 |
| 2009/0235265 A1 * | 9/2009 | Dawson et al. ................ | 718/104 |
| 2009/0292715 A1 * | 11/2009 | Chiaramonte et al. ......... | 707/101 |
| 2012/0116838 A1 * | 5/2012 | Bisdikian et al. ............. | 705/7.28 |

* cited by examiner

*Primary Examiner* — Ruolei Zong
(74) *Attorney, Agent, or Firm* — Dergosits & Noah LLP; Todd A. Noah (57) ABSTRACT

Identifying root causes of application underachievement in a virtually provisioned environment is described. A utilization measurement is recorded for each resource for each server in a virtually provisioned environment associated with an application operation if an application operation time exceeds a time constraint. The resources include a central processing unit resource, a memory resource, a network resource, and/or an input-output resource. Each utilization measurement is converted to a corresponding utilization range of multiple utilization ranges. After the application operation time exceeds the time constraint on a specified number of occasions, an identification of a specific resource for a specific server as a root cause of the application operation time exceeding the time constraint is output if the utilization record includes a specific range for the specific resource for the specific server more than a specified frequency.

20 Claims, 5 Drawing Sheets

$Apriori(T, \epsilon)$ $L_1 \leftarrow \{$ large 1-itemsets $\}$ $k \leftarrow 2$ while $L_{k-1} \neq \emptyset$ $C_k \leftarrow \{c | c = a \cup \{b\} \wedge a \in L_{k-1} \wedge b \in \bigcup L_{k-1} \wedge b \notin a\}$ for transactions $t \in T$ $C_t \leftarrow \{c | c \in C_k \wedge c \subseteq t\}$ for candidates $c \in C_t$ $count[c] \leftarrow count[c] + 1$ $L_k \leftarrow \{c | c \in C_k \wedge count[c] \geq \epsilon\}$ $k \leftarrow k+1$ return $\bigcup_k L_k$

FIG. 3

| V1 | V2 | V3 | V4 | V5 | V6 | V7 | V8 | V9 | V10 |
|---|---|---|---|---|---|---|---|---|---|
| R2(S1,I/O) | R1(S1,I/O) | R3(S1,I/O) | R3(S1,I/O) | R4(S1,I/O) | R8(S1,I/O) | R7(S1,I/O) | R5(S1,I/O) | R6(S1,I/O) | R6(S1,I/O) |
| R9(S1,M) | R9(S1,M) | R3(S1,M) | R1(S1,M) | R2(S1,M) | R2(S1,M) | R3(S1,M) | R7(S1,M) | R4(S1,M) | R8(S1,M) |
| R1(S1,cpu) | R2(S1,cpu) | R1(S1,cpu) | R5(S1,cpu) | R7(S1,cpu) | R6(S1,cpu) | R3(S1,cpu) | R3(S1,cpu) | R9(S1,cpu) | R2(S1,cpu) |
| R4(S1,N) | R3(S1,N) | R5(S1,N) | R6(S1,N) | R6(S1,N) | R2(S1,N) | R2(S1,N) | R7(S1,N) | R1(S1,N) | R1(S1,N) |
| R2(S2,I/O) | R3(S2,I/O) | R4(S2,I/O) | R1(S2,I/O) | R10(S2,I/O) | R3(S2,I/O) | R7(S2,I/O) | R1(S2,I/O) | R5(S2,I/O) | R5(S2,I/O) |
| R2(S2,M) | R3(S2,M) | R1(S2,M) | R2(S2,M) | R2(S2,M) | R7(S2,M) | R9(S2,M) | R10(S2,M) | R4(S2,M) | R4(S2,M) |
| R10(S2,cpu) | R8(S2,cpu) | R10(S2,cpu) | R10(S2,cpu) | R10(S2,cpu) | R10(S2,cpu) | R10(S2,cpu) | R10(S2,cpu) | R10(S2,cpu) | R10(S2,cpu) |
| R2(S2,N) | R4(S2,N) | R3(S2,N) | R3(S2,N) | R5(S2,N) | R1(S2,N) | R7(S2,N) | R8(S2,N) | R2(S2,N) | R1(S2,N) |

METHOD AND SYSTEM FOR IDENTIFYING ROOT CAUSES OF APPLICATION UNDERACHIEVEMENT IN A VIRTUALLY PROVISIONED ENVIRONMENT

BACKGROUND

Typically, the execution of a critical enterprise application has to meet a set of service level agreements between a software company that provides the application and the enterprise that uses the application. For example, the service level agreement for a healthcare application can require that processing an application operation to schedule a doctor's office visit should not take more than an average of 3.0 seconds, and require that processing an application operation to order medication should not take more than an average of 10.0 seconds. In another example, the service level agreement for a banking application can require that processing an application operation to approve a loan should not take more than an average of 5.0 seconds, and require that processing an application operation to produce a quarterly profits report should not take more than an average of 10.0 minutes. If the execution of an enterprise application's operations does not meet its service level agreements, the enterprise may not be efficient enough, and may lose millions of dollars by not being able to process as many application operations as expected, such as serving mobile phone calls or providing loans. A software company that provides the application may be required to pay fees to the enterprise when the processing of an application's operations does not meet the service level agreements. Preventing the violation of a service level agreement or resolving such a violation quickly requires the identification of the root cause of an application underachieving a service level agreement, but such identification is not an easy task, particularly in a virtually provisioned environment. A virtually provisioned environment may use thousands of servers in a data center to process application operations, and some application operations may be processed by dozens of servers. Identifying the root cause of application underachievement in a virtually provisioned environment may be quite challenging due to the vast number of server resources involved in processing application operations.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Embodiments herein identify root causes of application underachievement in a virtually provisioned network. An analysis application records a utilization measurement for each resource for each server in a virtually provisioned environment associated with an application operation if the application operation's time exceeds a time constraint, wherein the resources include a central processing unit resource, a memory resource, a network resource, and/or an input-output resource. For example, an analysis application records a CPU utilization of 9% and a memory utilization of 85% for server #1 and a CPU utilization of 93% and a memory utilization of 14% for server #2 when the processing of a healthcare application's operation to order medication takes more than 8.0 seconds. Each utilization measurement is converted to a corresponding utilization range of multiple utilization ranges. For example, the analysis application converts the CPU utilization of 9% and the memory utilization of 85% for server #1 to a CPU utilization range 1 and a memory utilization range 9, and converts the CPU utilization of 93% and the memory utilization of 14% for server #2 to a CPU utilization range 10 and a memory utilization range 2. After the application operation's time exceeds the time constraint on a specified number of occasions, an identification of a specific resource for a specific server as a root cause of the application operation's time exceeding the time constraint is output if the utilization record includes a specific range for the specific resource for the specific server more than a specified frequency. For example, after the processing of the healthcare application's operation to order medication takes more than 8.0 seconds on ten different occasions, the analysis application identifies the CPU utilization for server #2 as the root cause for the healthcare application's underachievement because the analysis application recorded CPU utilizations corresponding to the CPU utilization range 10 for server #2 during nine of the ten different occasions when the processing of the healthcare application's operation to order medication took more than 8.0 seconds.

Figure 1:
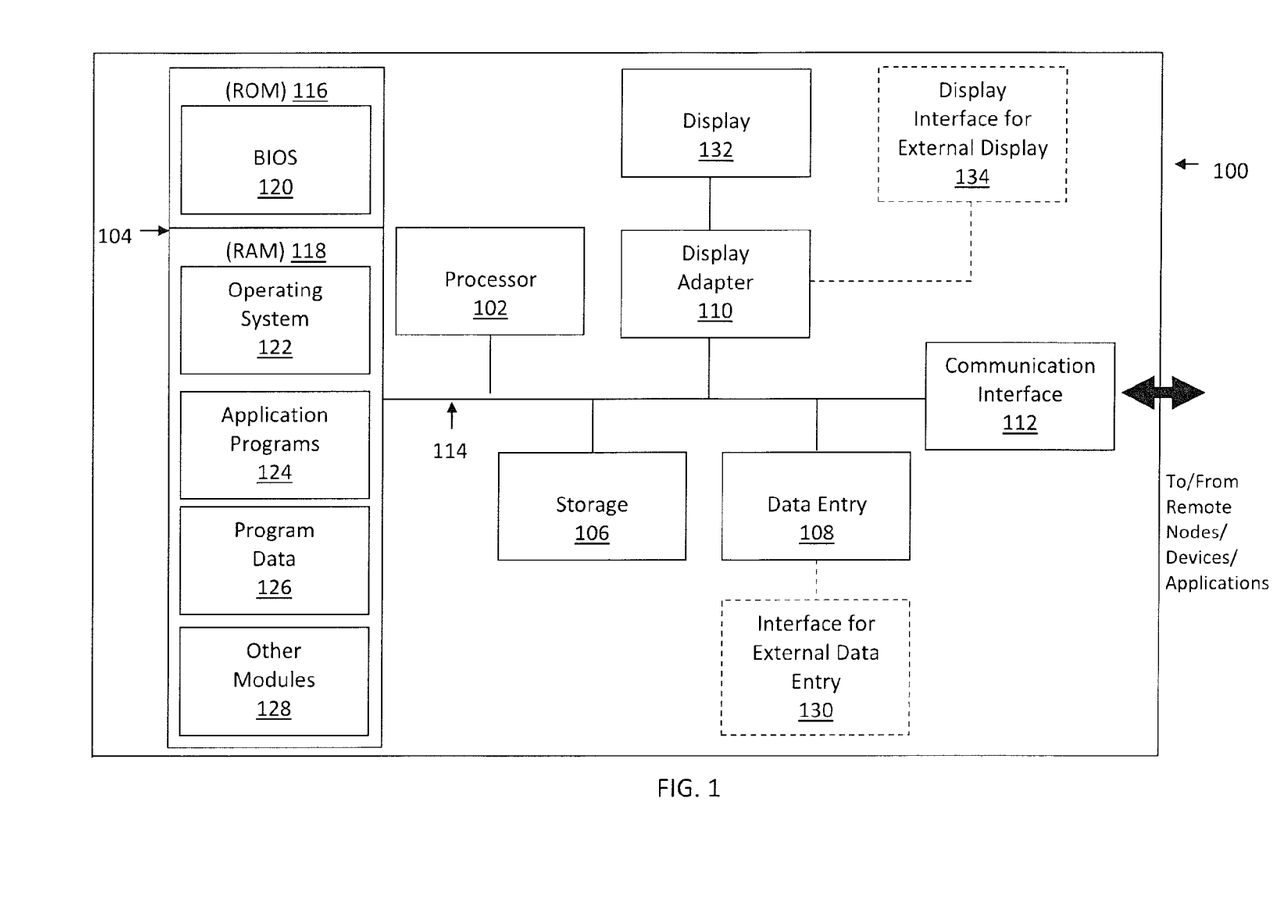
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for identifying root causes of application underachievement in a virtually provisioned environment.

Figure 2:
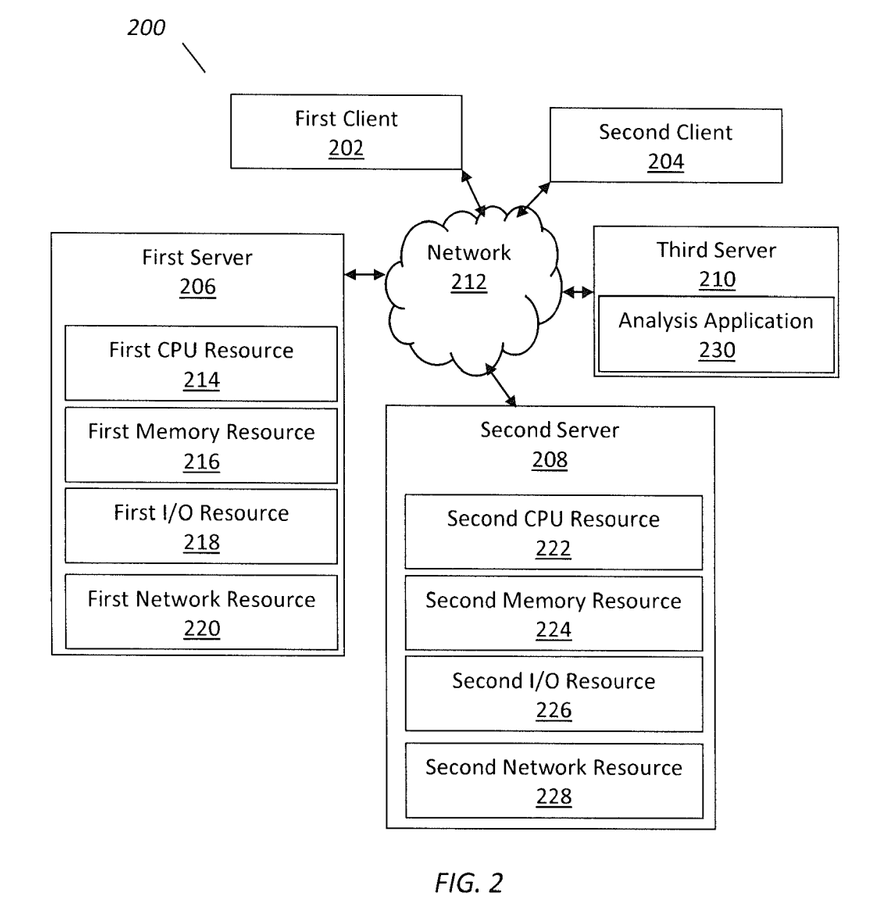
FIG. 2 illustrates a block diagram of an example system for identifying root causes of application underachievement in a virtually provisioned environment, under an embodiment.

FIG. 2 illustrates a block diagram of a system that implements identifying root causes of application underachievement in a virtually provisioned environment, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202 and a second client 204; and a first server 206, a second server 208, and a third server 210 that are provided by a hosting company. The clients 202-204 and the servers 206-210 communicate via a network 212. An enterprise uses the clients 202-204 to execute an enterprise application via the servers 206-208. The first server 206 allocates a first CPU resource 214, a first memory resource 216, a first I/O resource 218, and a first network resource 220 to process an enterprise application's operation in a virtually provisioned environment. The second server 208 allocates a second CPU resource 222, a second memory resource 224, a second I/O resource 226, and a second network resource 228 to process an enterprise application's operation in a virtually provisioned environment. FIG. 2 does not depict the location of an enterprise application because the operations of the enterprise application may be processed by any combination of the resources 214-220 allocated by the first server 206 and the resources 222-228 allocated by the second server 208. The third server 210 includes an analysis application 230 to identify root causes of application underachievement in a virtually provisioned environment. Although FIG. 2 depicts the system 200 with two clients 202-204, three servers 206-210, one network 212, two CPU resources 214 and 222, two memory resources 216 and 224, two I/O resources 218 and 226, two network resources 220 and 228, and one analysis application 230, the system 200 may include any number of clients 202-204, servers 206-210, networks 212, CPU resources 214 and 222, memory resources 216 and 224, I/O resources 218 and 226, network resources 220 and 228, and analysis applications 230. The clients 202-204 and the servers 206-210 may each be substantially similar to the system 100 depicted in FIG. 1.

The analysis application 230 identifies a common pattern for each of the enterprise application operations' underachievement in a virtually provisioned environment. Underachievement for an application's operations may be defined based on a many different performance indicators, such as a service level agreement that is specified for the application's operations. If a healthcare application operation to order medication is processed by a virtually provisioned environment, and 9,987 times out of 10.000 the processing time enters the "red zone" of a service level agreement, and is followed by high CPU utilization on server #46 and high memory utilization on server #47, then these two servers are problematic in terms of the healthcare application operation to order medication. The analysis application 230 captures such statistics for application operations processed in a virtually provisioned environment. The "red zone" for a service level agreement underachievement may be defined as a certain percentage of a service level agreement requirement. For example, the "red zone" for an enterprise application is specified at 20%, and the service level agreement for the healthcare application operation is 3.0 seconds to schedule a doctor's office visit and 10.0 seconds to order medication. For this example, the healthcare application enters the "red zone" when the operation to schedule a doctor's office visit takes more than 2.4 sec (3.0 seconds minus 20% of 3.0 seconds) or the operation to order medication takes more than 8.0 seconds (10.0 seconds minus 20% of 10.0 seconds).

The analysis application 230 determines whether an enterprise application's operation exceeds a time constraint, which may be based on a service level agreement. For example, the analysis application 230 determines that a healthcare application's operation to order medication exceeds the time constraint of 8.0 seconds, which is 20% less than the 10.0 seconds specified as a violation of a service level agreement.

On every occasion that the processing of an enterprise application operation's time enters the "red zone," the analysis application 230 takes a snapshot of the statistics of the resources (CPU resources, memory resources, I/O resources, and network resources) for servers in the virtually provisioned environment. The analysis application 230 may use available tools to capture such statistics because the enterprise application is deployed in a virtually provisioned environment. The analysis application 230 records a utilization measurement for each resource for each serves in a virtually provisioned environment associated with an application operation if the application operation's time exceeds a time constraint, wherein the resources include a central processing unit resource, a memory resource, a network resource, and/or an input-output resource. For example, the analysis application 230 records a CPU utilization of 9% and a memory utilization of 85% for the first server 206 and a CPU utilization of 93% and a memory utilization of 14% for the second server 208 when the processing of a healthcare application's operation to order medication takes more than 8.0 seconds. The utilization measurement may be a percentage of a maximum possible utilization amount. For example, the CPU utilization of 93% for the first server 206 indicates that 93% of the CPU capacity allocated by the first server 206 is utilized for the processing of the specific enterprise application operation.

The analysis application 230 may reduce the complexity of the calculations if for each operation the information about the involved servers is captured at endpoints' configuration. Therefore, instead of the analysis application 230 taking the snapshot of the statistics for the resources of all servers in the virtually provisioned environment, it is possible for the analysis application 230 to probe only relevant servers for each specific operation. The analysis application 230 may record the utilization measurement for each resource for servers identified as involved with the application operation by an endpoints configuration. For example, the analysis application 230 records the utilization measurement for each resource for the servers 206 and 208 when the healthcare application operation to order medication underachieves because the endpoints configuration indicates that other servers (not depicted in FIG. 2) in the virtually provisioned environment are not involved in the processing the healthcare application operation to order medication.

In order to properly classify the snapshot results, the analysis application 230 needs to identify which snapshot results are "similar." For example, if the healthcare application operation to order medication entered the "red zone" twice, the first time the CPU utilization for server #34 was 97.3%, and the second time the CPU utilization for server #34 was 97.8%, the analysis application 230 needs to identify that the reason for the problem is "similar" results. In order to accomplish this identification of "similar" results, the analysis application 230 uses a known technique for converting continuous results to discrete results. For example, the continuous range from 0% to 100% for all utilization dimensions is divided into X number of ranges. If X equals 10, the analysis application 230 uses the ten ranges: R1[0-10], R2[11-20], R3[21-30], R4[31-40], R5[41-50], R6[51-60], R7[61-70], R8[71-80], R9[81-90], and R10[91-100]. Therefore, the CPU utilizations equal to 97.3% and 97.8% will belong to the same range R10[91-100], which enables the analysis application 230 to identify the "similar" results of R10 when searching for "similar" results. The analysis application 230 converts each utilization measurement to a corresponding utilization range of multiple utilization ranges. For example, the analysis application 230 converts the CPU utilization of 9% and the memory utilization of 85% for the first server 206 to a CPU utilization range 1 and a memory utilization range 9, and converts the CPU utilization of 93% and the memory utilization of 14% for the second server 208 to a CPU utilization range 10 and a memory utilization range 2.

The analysis application 230 determines whether an enterprise application's operation exceeds a time constraint on a specified number of occasions. For example, the analysis application 230 determines whether ten snapshots of statistics have been recorded following occasions when the healthcare application operation to order medication exceeded 8.0 seconds. The analysis application 230 may set the specified number of occasions for entering the "red zone" relatively high, such as at the number ten, to avoid the problems of attempting to analyze sample sizes that are too small. For a virtually provisioned environment that consists of N number of servers (S1, S2, . . . SN) and measured by four utilization dimensions (CPU utilization, I/O utilization, memory utilization, and network utilization), the analysis application 230 defines a N multiplied by 4 dimension vector V. The values for each of the vector dimensions include discrete range values described above, such as R1, R2, . . . R10. A simplified example of a table that lists vectors that include utilization ranges is discussed below in reference to FIG. 4.

If an enterprise application operation's time exceeds a time constraint on a specified number of occasions, the analysis application 230 determines whether the utilization record includes a specific range for a specific resource for a specific server more than a specified frequency. For example, after the processing of the healthcare application's operation to order medication takes more than 8.0 seconds on ten different occasions, the analysis application 230 executes an apriori algorithm to determine which range for which resource for which server is recorded in the utilization measurement record more than other range-resource-server combinations. An apriori algorithm is discussed further below in reference to FIG. 3. Although FIG. 3 depicts an apriori algorithm, the analysis application 230 may execute another algorithm to determine which range for which resource for which server is recorded in the utilization measurement record more than other range-resource-server combinations.

If the utilization record includes a specific range for a specific resource for a specific server more than a specified frequency, the analysis application 230 outputs an identification of the specific resource for the specific server as a root cause for the application operation's time exceeding a time constraint. For example, the analysis application 230 identifies the CPU utilization for the second server 208 as the root cause of the healthcare application's underachievement because the analysis application 230 recorded CPU utilizations corresponding to the CPU utilization range 10 for the second server 208 during nine of the ten different occasions when the processing of the healthcare application's operation to order medication took more than 8.0 seconds. Although this example illustrates the identification of a single root cause of application underachievement based on a specific utilization range that occurred at the frequency of 90%, the analysis application 230 may identify multiple root causes of application underperformance, and each root cause may be based on a utilization range that occurred at a different frequency than 90%.

Figure 3:
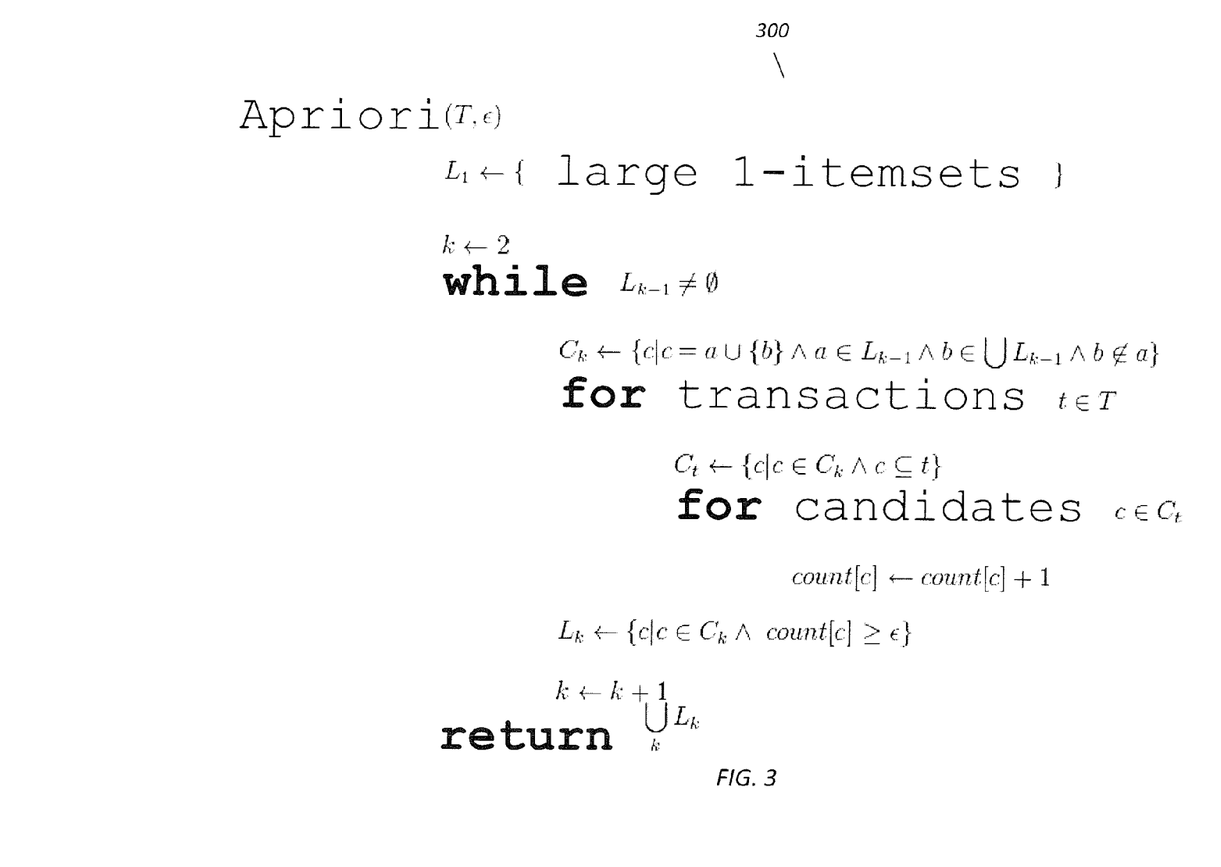
FIG. 3 is an algorithm for identifying root causes of application underachievement in a virtually provisioned environment, under an embodiment.

FIG. 3 is an example algorithm for identifying root causes of application underachievement in a virtually provisioned environment. Although FIG. 3 depicts an "Apriori" algorithm 300, the analysis application 230 may use other algorithms to determine which range for which resource for which server is recorded in a utilization measurement record more than other range-resource-server combinations. The "apriori" algorithm outputs the set of items that occurs most frequently for each service level agreement "red zone" entry or violation.

Figure 4:
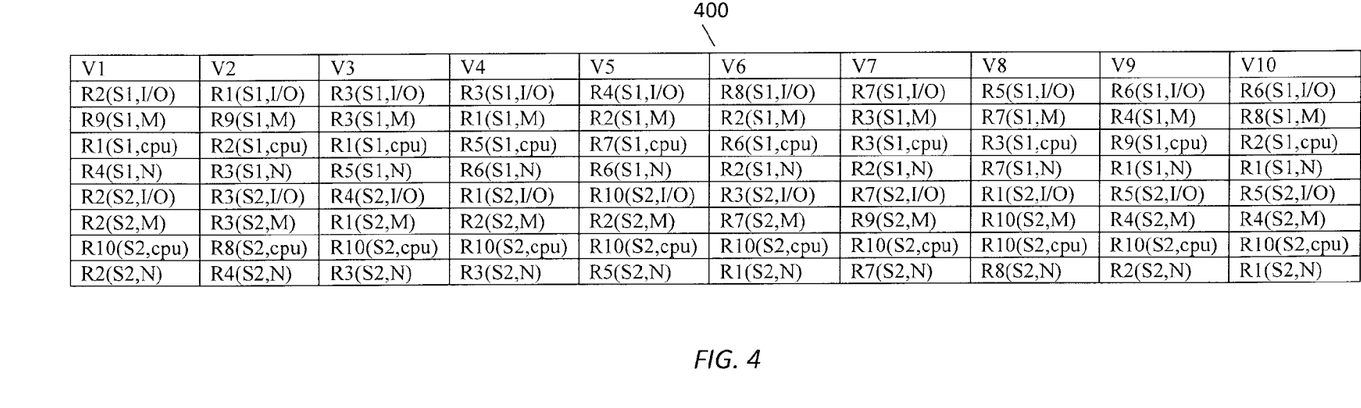
FIG. 4 is a simplified table used for identifying root causes of application underachievement in a virtually provisioned environment, under an embodiment.

FIG. 4 is a simplified example table for identifying root causes of application underachievement in a virtually provisioned environment. The table 400 represents ten snapshots of the statistics of resources for a virtually provisioned environment (V1, V2, . . . V10) that were taken after the processing of the enterprise application operations entered the "red zone" as defined by a service level agreement on ten different occasions. The snapshots were taken of a virtually provisioned environment that includes the two servers 206-208 (S1 and S2) with four utilization dimensions: I/O, memory ("M"), CPU ("cpu") and network ("N"). Each cell in the table 400 has information about the utilization (I/O utilization, CPU utilization, memory utilization, or network utilization), the server on which the utilization was measured, and a discrete value that represents the converted result of the utilization measurement. For example, the R9(S1,M) in the column V1 indicates that for the first server 206 (S1), the memory utilization ("M") was at the range R9(81%-90%). Similarly, the item R10(S2,cpu) in the column V3 indicates that the CPU utilization on the second server 208 (S2) was at the range R10(91%-100%). The "apriori" algorithm applied to the table 400 will indicate that nine snapshots out of ten snapshots included the item R10(S2,cpu), which means that in 90% of the occasions when the application operation's time entered the "red zone" defined by the service level agreement, a high CPU utilization (91%-100%) on the second server 208 (S2) was involved. Therefore, the analysis application 230 executes the "apriori" algorithm and determines that high CPU utilization on the second server 208 (S2) is the root cause of the problem in this simple example.

Figure 5:
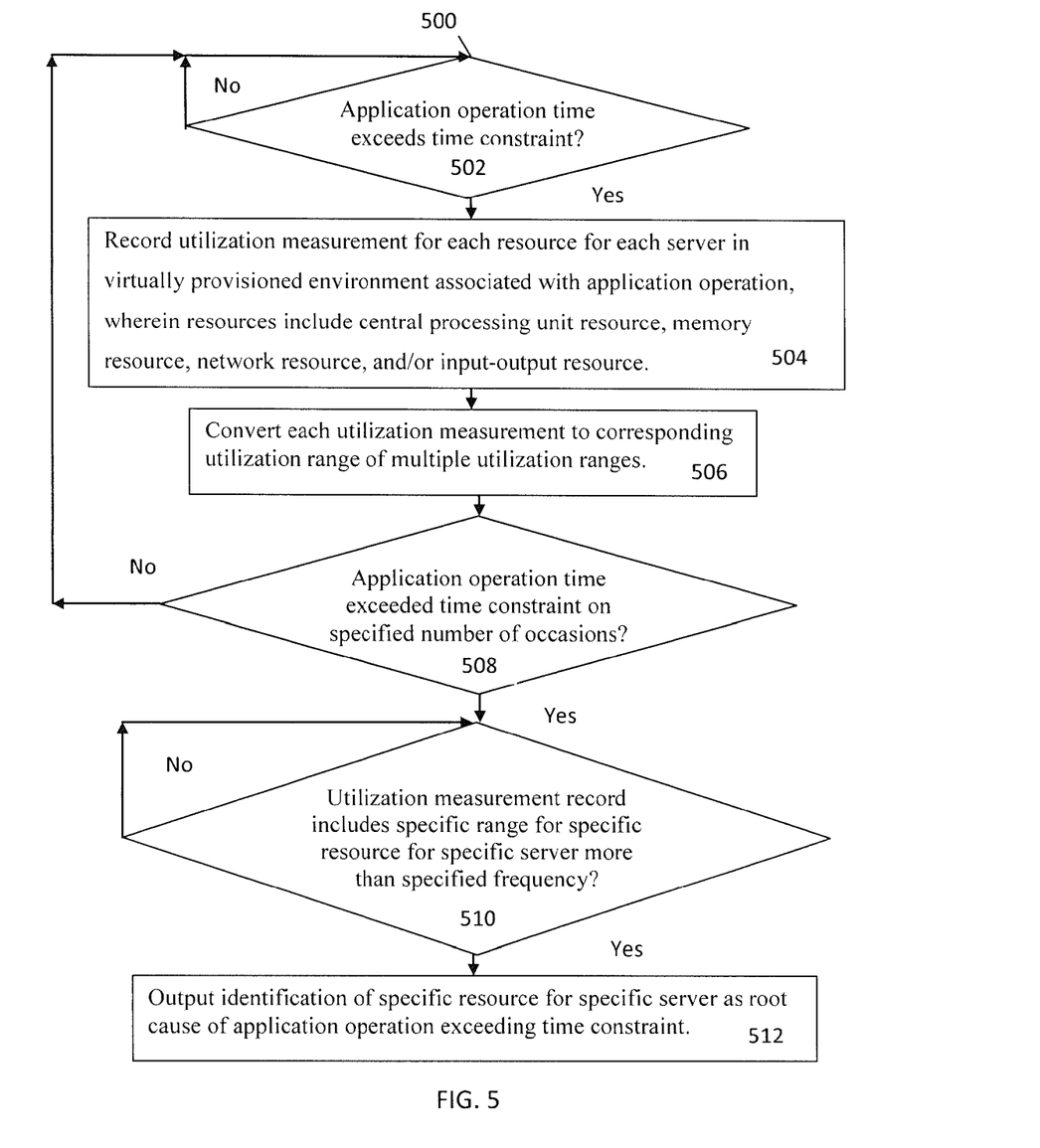
FIG. 5 is a flowchart that illustrates a method of identifying root causes of application underachievement in a virtually provisioned environment, under an embodiment.

FIG. 5 is a flowchart that illustrates a method of identifying root causes of application underachievement in a virtually provisioned environment. Flowchart 500 illustrates method acts illustrated as flowchart blocks for certain steps involved in and/or between the client 202-204 and/or the servers 206-210 of FIG. 2.

A determination is made whether an application operation's time exceeds a time constraint, act 502. For example, the analysis application 230 determines whether the processing of a healthcare application's operation to order medication takes more than 8.0 seconds. If the application operation's time exceeds the time constraint, the flowchart 500 continues to act 504. If the application operation's time does not exceed the time constraint, the flowchart 500 returns to act 502 to continue checking for when the application operation's time exceeds the time constraint.

A utilization measurement is recorded for each resource for each server in a virtually provisioned environment associated with an application operation, wherein the resources include a central processing unit resource, a memory resource, a network resource, and/or an input-output resource, act 504. For example, the analysis application 230 records a CPU utilization of 9% and a memory utilization of 85% for the first server 206 and a CPU utilization of 93% and a memory utilization of 14% for the second server 208.

Each utilization measurement is converted to a corresponding utilization range of multiple utilization ranges, act 506. For example, the analysis application 230 converts the CPU utilization of 9% and the memory utilization of 85% for the first server 206 to a CPU utilization range 1 and a memory utilization range 9, and converts the CPU utilization of 93% and the memory utilization of 14% for the second server 208 to a CPU utilization range 10 and a memory utilization range 2.

A determination is made whether an application operation's time exceeded a time constraint on a specified number of occasions, act 508. For example, the analysis application 230 determines whether the processing of the healthcare application's operation to order medication takes more than 8.0 seconds on ten different occasions. If the application operation's time exceeded the time constraint on the specified number of occasions, the flowchart 500 continues to act 510. If the application operation's time did not exceed the time constraint on the specified number of occasions, the flowchart 500 returns to act 502 to continue checking for when the application operation's time exceeds the time constraint.

A determination is made whether a utilization measurement record includes a specific range for a specific resource for a specific server more than a specified frequency, act 510. For example, the analysis application 230 determines which range for which resource for which server is recorded in a utilization measurement record more than other range-resource-server combinations. If the utilization measurement record includes a specific range for a specific resource for a specific server more than a specified frequency, the flowchart 500 continues to act 512. If the utilization measurement record does not include a specific range for a specific resource for a specific server more than a specified frequency, the flowchart 500 returns to act 510 to continue checking whether the utilization measurement record includes a specific range for a specific resource for a specific server more than a specified frequency for other range-resource-server combinations.

An identification is output of a specific resource for a specific server as a root cause for an application operation's time exceeding a time constraint, act 512. For example, the analysis application 230 outputs the identification of the CPU utilization for the second server 208 as the root cause of the healthcare application's underachievement because the analysis application 230 recorded CPU utilizations corresponding to the CPU utilization range 10 for the second server 208 during nine of the ten different occasions when the processing of the healthcare application's operation to order medication took more than 8.0 seconds.

Although FIG. 5 depicts the acts 502-512 occurring in a specific order, the acts 502-512 may occur in another order. Embodiments herein enable the identification of root causes of application underachievement in a virtually provisioned environment.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for identifying root causes of application underachievement in a virtually provisioned environment, the system comprising:
   one or more processors coupled to a non-transitory computer-readable medium;
   a processor-based application stored on the non-transitory computer-readable medium, which when executed, will cause the one or more processors to:
   determine whether an application operation time exceeds a time constraint;
   record a capacity utilization measurement snapshot for a plurality of resources for a plurality of servers in a virtually provisioned environment associated with the application operation in response to a determination that the application operation time exceeds the time constraint;

convert each capacity utilization measurement snapshot to a corresponding utilization range of a plurality of utilization ranges;

determine whether the application operation time exceeded the time constraint on a predetermined number of occasions;

determine whether the capacity utilization measurement snapshot includes a specific range for a specific resource of the plurality of resources for a specific server of the plurality of servers more than a predetermined frequency in response to a determination that the application operation time exceeded the time constraint on the predetermined number of occasions; and output an identification of the specific resource as a root cause of the application operation time exceeding the time constraint in response to a determination that the capacity utilization measurement snapshot includes the specific range more than the predetermined frequency.

2. The system of claim 1, wherein the time constraint is based on a service level agreement.

3. The system of claim 1, wherein the capacity utilization measurement snapshot comprises a percentage of a maximum possible utilization amount.

4. The system of claim 1, wherein recording the capacity utilization measurement snapshot for each resource of the plurality of resources for each server of the plurality of servers in the virtually provisioned environment comprises recording the capacity utilization measurement snapshot for each resource of the plurality of resources for servers identified as involved with the application operation by an endpoints configuration.

5. The system of claim 1, wherein the plurality of resources comprise the central processing unit resource, the memory resource, the network resource, and the input-output resource.

6. The system of claim 1, wherein determining whether the utilization measurement snapshot includes the specific range for the specific resource of the plurality of resources for the specific server of the plurality of servers more than the predetermined frequency is determined by an apriori algorithm.

7. The system of claim 1, wherein the utilization measurement snapshot comprises a table storing a triple of utilization range, resource, and server corresponding to each utilization measurement.

8. A computer-implemented method for identifying root causes of application underachievement in a virtually provisioned environment, the method comprising:

determining whether an application operation time exceeds a time constraint;

recording a capacity utilization measurement snapshot for each resource of a plurality of resources for each server of a plurality of servers in a virtually provisioned environment associated with the application operation in response to a determination that the application operation time exceeds the time constraint;

converting each capacity utilization measurement snapshot to a corresponding utilization range of a plurality of utilization ranges;

determining whether the application operation time exceeded the time constraint on a predetermined number of occasions;

determining whether the capacity utilization measurement snapshot includes a specific range for a specific resource of the plurality of resources for a specific server of the plurality of servers more than a predetermined frequency in response to a determination that the application operation time exceeded the time constraint on the predetermined number of occasions; and outputting an identification of the specific resource for the specific server as a root cause of the application operation time exceeding the time constraint in response to a determination that the utilization record includes the specific range more than the predetermined frequency.

9. The computer-implemented method of claim 8, wherein the time constraint is based on a service level agreement.

10. The computer-implemented method of claim 8, wherein the capacity utilization measurement snapshot comprises a percentage of a maximum possible utilization amount.

11. The computer-implemented method of claim 8, wherein recording the capacity utilization measurement snapshot for each resource of the plurality of resources for each server of the plurality of servers in the virtually provisioned environment comprises recording the capacity utilization measurement snapshot for each resource of the plurality of resources for servers identified as involved with the application operation by an endpoints configuration.

12. The computer-implemented method of claim 8, wherein the plurality of resources comprise the central processing unit resource, the memory resource, the network resource, and the input-output resource.

13. The computer-implemented method of claim 8, wherein determining whether the capacity utilization measurement snapshot includes the specific range for the specific resource of the plurality of resources for the specific server of the plurality of servers more than the predetermined frequency is determined by an apriori algorithm.

14. The computer-implemented method of claim 8, wherein the capacity utilization measurement snapshot comprises a table storing a triple of utilization range, resource, and server corresponding to each utilization measurement.

15. A computer program product, comprising a non-transitory computer-readable medium having computer-readable program code embodied therein to be executed by one or more processors, the program code including instructions to:

determine whether an application operation time exceeds a time constraint;

record a capacity utilization measurement snapshot for each resource of a plurality of resources for each server of a plurality of servers in a virtually provisioned environment associated with the application operation in response to a determination that the application operation time exceeds the time constraint;

convert each capacity utilization measurement snapshot to a corresponding utilization range of a plurality of utilization ranges;

determine whether the application operation time exceeded the time constraint on a predetermined number of occasions;

determine whether the capacity utilization measurement snapshot includes a specific range for a specific resource of the plurality of resources for a specific server of the plurality of servers more than a predetermined frequency in response to a determination that the application operation time exceeded the time constraint on the predetermined number of occasions; and output an identification of the specific resource for the specific server as a root cause of the application operation time exceeding the time constraint in response to a determination that the utilization record includes the specific range more than the predetermined frequency.

16. The computer program product of claim 15, wherein the time constraint is based on a service level agreement.

17. The computer program product of claim 15, wherein the capacity utilization measurement snapshot comprises a percentage of a maximum possible utilization amount.

18. The computer program product of claim 15, wherein recording the capacity utilization measurement snapshot for each resource of the plurality of resources for each server of the plurality of servers in the virtually provisioned environment comprises recording the capacity utilization measurement snapshot for each resource of the plurality of resources for servers identified as involved with the application operation by an endpoints configuration.

19. The computer program product of claim 15, wherein the plurality of resources comprise the central processing unit resource, the memory resource, the network resource, and the input-output resource.

20. The computer program product of claim 15, wherein determining whether the capacity utilization measurement record snapshot includes the specific range for the specific resource of the plurality of resources for the specific server of the plurality of servers more than the predetermined frequency is determined by an apriori algorithm.

* * * * *